(No Model.)

R. L. LUKENS & G. H. ZSCHECH.
FLUE SCRAPER.

No. 604,058. Patented May 17, 1898.

WITNESSES
Hermann Heinze
Wm. R. Rummler

INVENTORS
Richard L. Lukens. Gustav H. Zschech.
BY Alfred Meltzer,
his ATTY.

UNITED STATES PATENT OFFICE.

RICHARD L. LUKENS AND GUSTAF H. ZSCHECH, OF CHICAGO, ILLINOIS.

FLUE-SCRAPER.

SPECIFICATION forming part of Letters Patent No. 604,058, dated May 17, 1898.

Application filed August 27, 1897. Serial No. 649,728. (No model.)

*To all whom it may concern:*

Be it known that we, RICHARD L. LUKENS and GUSTAF H. ZSCHECH, citizens of the United States, residing at Chicago, in the county of Cook and State of Illinois, have invented a new and useful Improvement in Flue-Scrapers, of which the following is a specification.

Our invention relates to flue-scrapers; and its objects are, first, to provide a flue-scraper of simple construction, with means for adjusting the blades so as to limit their outward movement, and thus adjust their pressure against the walls of the flues or tubes in which the same are used, and, second, to adapt such means of adjustment to flue-scrapers operating both on the forward and return strokes. We accomplish these objects by the construction illustrated in the accompanying drawings, in which—

Figure 1:
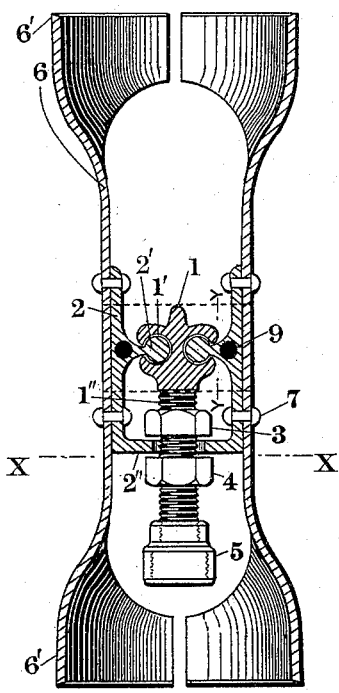
Figure 2:
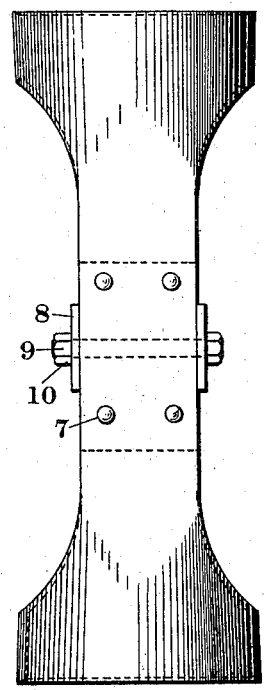
Figure 3:
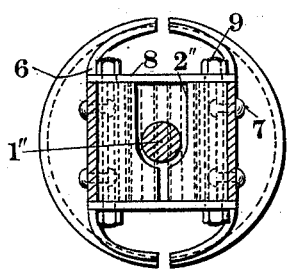
Figure 4:
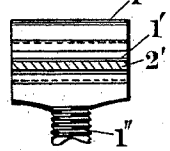

Figure 1 is a longitudinal section of a flue-scraper embodying our invention; Fig. 2, a side view of Fig. 1; Fig. 3, a section of Fig. 1 on the line $x\,x$; and Fig. 4 is a section on the line $y\,y$ of Fig. 1, showing the member 1 and the neck of one of the lugs 2'.

In the construction shown are two shanks 6, each having a blade 6' on either end. To the inside of each of these shanks is secured a member 2 by the rivets 7. The members 2 each have an inwardly-projecting lug 2' and an inwardly-projecting shoulder 2''. The members 2 are pivotally connected to the plates 8 by the bolts 9, with the nuts 10 thereon.

The member 1 has the sockets 1' therein, engaging the lugs 2', and has the threaded shank 1'' passing out between the shoulders 2''. A nut 3 is seated on the shank 1'' above the shoulders 2'' and a nut 4 below same. On the lower end of the shank 1'' is an interiorly-threaded collar 5, into which the handle for operating the device is screwed. The shoulders 2'' are cut out, as shown in Figs. 1 and 3, for receiving the shank 1'' at the same time that the lugs 2' are received by the sockets 1' and before the plates are attached.

The operation of the device is as follows: When the nuts 3 and 4 are free from the shoulders 2'', the force in pushing or pulling the scraper through a flue or tube will act directly on the lugs 2', so that when the scraper is pushed forward the blades 6' at the top of Fig. 1 will tend to separate, their shanks operating pivotally on the bolts 9. When the scraper is pulled in the other direction, the blades 6' at the bottom of Fig. 1 will tend to separate. When, however, the nut 4 is screwed up against the shoulders 2''', the same will bind on the shoulders when the handle is pushed forward, preventing the opening of the upper blades, the main force being then applied directly to the shoulders. When the nut 3 is screwed down against the shoulders 2'', the lower blades will likewise be prevented from opening when the handle is pulled back. It will be seen that the position of the nuts 3 and 4 with relation to the shoulders will thus regulate the degree of separation of the blades, so that if the nuts are some distance from the shoulders the blades will open until the shoulders bind on one of the nuts.

The shanks 6, with their blades 6', may be renewed when the blades are worn out, the other parts being used again.

Our invention prevents unnecessary wear on the walls of the flues and also on the blades, since it provides for adjusting the latter to open at any desired degree. It will be seen that the object is to limit the outward movement of the blades, while still allowing a pivotal movement. The nuts will not therefore be screwed tight against the shoulders. By this arrangement the blades may be adjusted to open just wide enough to clean the flue without damage either to its walls or to the blades and still permit sufficient pivotal movement of the blades to cause those toward the direction of movement of the device to open, while those at the other end tend to close.

It will be seen that the minor details of construction may be altered without departing from the spirit of our invention. Any other adjustable device for limiting the degree of separation of the blades to attain substantially the same end may be substituted for the nuts 3 and 4 and the shoulders 2''.

What we claim, and desire to secure by Letters Patent, is—

1. A flue-scraper comprising a threaded rod; a pair of shanks pivoted thereto; each shank having a scraping edge on each end, and each shank having a shoulder 2'' projecting toward said rod; a nut on said rod above said shoulders and a nut on said rod below said shoulders; said nuts being adapted to bind against said shoulders and thereby limit the degree of separation of the scraping edges on corresponding ends of the shanks; substantially as described.

2. A flue-scraper comprising a threaded rod; a pair of shanks pivoted thereto; each shank having a scraping edge on each end, and each shank having a shoulder 2″ projecting toward said rod; a nut on said rod above said shoulders and a nut on said rod below said shoulders; said nuts being adapted to bind against said shoulders and thereby limit the degree of separation of the scraping edges on corresponding ends of the shanks; and a connecting member 8 pivoted to each shank on a different axis than the pivoted axis between such shank and the rod; substantially as described.

3. A flue-scraper, comprising a pair of shanks, each having a scraping edge on each end; a lug 2′ and a shoulder 2″ projecting inwardly from each shank; a member 1, adapted for attachment to a handle, having sockets 1′ therein for receiving the lugs, and having a threaded shank, extending between said shoulders, with a nut thereon above said shoulders, and a nut thereon below said shoulders; said nuts being adapted to bind against said shoulders and thereby limit the degree of separation of the scraping edges on corresponding ends of the shanks, substantially as described.

4. A flue-scraper comprising a pair of shanks, each having a scraping edge on each end; a member 2, having the lug 2′ and the shoulder 2″ projecting inwardly therefrom, secured to the inner face of each shank; a connecting member 8 pivoted to each member 2; and a member 1 adapted for attachment to a handle, having sockets 1′ therein for receiving the lugs, and having a threaded shank extending between said shoulders with a nut thereon above said shoulders, and a nut thereon below said shoulders; said nuts being adapted to bind against said shoulders and thereby limit the degree of separation of the scraping edges on corresponding ends of the shanks, substantially as described.

RICHARD L. LUKENS.
GUSTAF H. $\overset{\text{his}}{\times}$ ZSCHECH.
$\phantom{GUSTAF H. \times}$ mark Witnesses:
ALFRED MELTZER,
WM. R. RUMMLER.